Jan. 30, 1968        G. H. HALL        3,365,946

CRYOGENIC TEMPERATURE TRANSDUCER

Filed March 29, 1965        2 Sheets-Sheet 1

INVENTOR.
GEORGE H. HALL
BY
Robert J. Schiller
ATTORNEY

INVENTOR.
GEORGE H. HALL

United States Patent Office 3,365,946
Patented Jan. 30, 1968

3,365,946
CRYOGENIC TEMPERATURE TRANSDUCER
George H. Hall, Westford, Mass., assignor to Arthur D. Little, Inc., Cambridge, Mass., a corporation of Massachusetts
Continuation-in-part of application Ser. No. 228,565, Oct. 5, 1962. This application Mar. 29, 1965, Ser. No. 443,587
11 Claims. (Cl. 73—368.1)

This application is a continuation-in-part of application Ser. No. 228,565, filed Oct. 5, 1962 and now abandoned.

This invention relates to thermometry, and more particularly to a novel temperature transducer which is accurately responsive to low temperatures. While it is of particular value in measuring extremely low temperatures, e.g. in the range of 2° to 60° K., it is also useful at higher temperatures in the cryogenic field, e.g. those of liquid oxygen and liquid nitrogen.

The precise measurement of temperatures in the cryogenic field is becoming increasingly important with the marked growth of this field in both industrial and military areas. The accurate instrumentation of apparatus for gas liquefaction and purification, refrigeration, infrared detection, masers, rocket engines, and high speed computers, for example, is becoming especially critical, and demands a new approach to solution of the problem of precise temperature measurement.

Many different devices are now used for this purpose, but all have one or more disadvantages such that they are not sufficiently accurate or versatile as temperature measuring devices in the range below 60° K. For example, thermocouples have poor sensitivity below about 50° K., and their measurements are relatively meaningless at 20° K. and below. Helium gas thermometers fall off in accuracy below 10° K. due to deviations from gas laws and unknown magnitude of gas adsorption; the bulb size and the need for capillary tube to connect the bulb to a pressure sensor make these gas thermometers awkward to use. Vapor pressure thermometers, though accurate and sensitive within many parts of the range below 60° K., are incapable of measurements in the range between 14° K. and 5.2° K., which is that between $H_2$ and He vapor pressure thermometers. Carbon resistance thermometers have only a narrow range—about 5° C.—below 10° K., and are also subject to changes in calibration.

The invention is an improvement upon transducers of the type disclosed by W. M. Fulton in U.S. Patent No. 766,820, issued Aug. 9, 1904. The basic principles employed are similar but the Fulton device is not suited for cryogenic applications as will appear hereinafter.

The transducer of this invention is capable of measuring a very wide band of temperatures with high and reproducible accuracy. This band extends from about 2° K., up to 60° K.—and can be even higher, but the band above 60° K. is reasonably well covered by instruments now readily available so is not of as much interest here. The transducer functions as an analog thermometric device, i.e. is capable of providing temperature data in the form of a continuous variable at least across its entire operating or measuring range.

The sensitivity of this transducer is believed to be much greater than those presently available throughout its operating range. No power input is needed for temperature measurement; this is important where the slightest heat input would upset thermal equilibrium. This device can also be mounted in any position, removed easily and reinstalled, without affecting calibration or accuracy. It can also incorporate switching means responsible to a predetermined temperature level in the medium whose temperature is to be measured.

It is, accordingly, the purpose of this invention to provide a transducer having the foregoing characteristics. Other objects of the present invention are to provide a method of accurately measuring temperatures, and to provide a method and means employing the transducer of the present invention to determine temperature.

To effect the foregoing and other objects, in accordance with one aspect of the present invention there is provided a transducer or temperature sensor comprising a fluid-tight rigid hollow enclosure adapted to transfer heat-energy readily between its exterior environment and its interior. The enclosure is divided transversely into a pair of fluid-tight chambers by partition means movably mounted in the enclosure interior. The volumes of the chambers are thus inversely related to one another. The transducer includes a first homogeneous material disposed in one of the chambers and a second homogeneous material disposed in the other chamber. Each material is characterized in being substantially fluid, i.e. either in a gaseous phase or a combination of gaseous and liquid phases at the temperature range within which the transducer is intended to be operative and at the pressures subsisting within the enclosure at that temperature range. The gaseous states of the two materials differ in physical characteristics from one another, particularly in the responsiveness or change in the pressure/volume ratio to an increment of temperature in the operating range of the transducer.

More specifically, defining the behavior of the respective gaseous portion of each material by the corresponding Virial equation, the respective second Virial coefficients (in the vapor pressure expansion) of each gaseous portion are different. The partition means will reach an equilibrium position at which the gas or vapor pressures exerted on opposite sides of the partition means by the gaseous components of the respective fluids in their respective chambers are substantially equal when the entire enclosure is substantially at a uniform temperature. The partition means thus forms a surface centrally and variably posiitoned between the opposite ends of the enclosure which possess respective surfaces. In a preferred form each of the three surfaces is electrically conductive and electrically insulated from the other.

This device is placed at the position where a temperature is to be measured, so that the gases in the device are in out-of-contact heat-exchange relationship with the medium whose temperature is to be measured. The equilibrium position of the central surface with respect to the other two surfaces, during the operation of the transducer, is then substantially determined by the pressure-volume-temperature characteristics of each of the gas volumes in its respective chamber. This assumes that, in the event material in a chamber is in mixed phases, the liquid or solid phase thereof is of negligible volume compared to the gaseous or vapor phase. The position of the central surface with respect to the other two surfaces is then measured, preferably in terms of the capacity of the condensers existing between that surface and the other two surfaces.

When electrically conductive surfaces are used, they may be of any convenient configuration and arrangement as long as they form condensers whose capacity can be readily measured. They may comprise conductive coatings on non-conductive substrates, or may consist entirely of electrically conductive material.

The entire device, other than the conventional auxiliary equipment for measuring movement of the central surface, need occupy very little space, e.g. even as little as 0.1–0.2 cubic inch. The auxiliary equipment can be placed at any distance convenient for the purpose to which it is put, and in conventional fashion.

The position of the central surface with respect to the other two surfaces will vary in accordance with the pressure-volume characteristics of the gaseous fluids in the two chambers on each side of it. If the two volumes are initially loaded with gases at atmospheric temperature, two effects will cause movement of the central surface toward one or the other of the other two surfaces, as the temperature to be measured is reduced. These are (a) changes in compressibility factors of the two gases, and (b) changes of phase of those gases. As to the former, the effect is rather small unless the gas pressure is very high (see FIG. 5) or one of the gases is near saturation. It should be noted that two theoretically perfect gases would have compressibility factors equal to unity, and hence the position of the central surface would not vary with temperature. No gas, however, acts as a theoretically perfect gas throughout the temperature range of its gaseous condition, especially in the lower part of that range. As to change of phase, the two gases will eventually become liquefied or solidified as the temperature goes down, depending upon the pressure level. If two gases having widely separated condensing temperatures, e.g. helium and neon, are used, a marked change in position of the central surface will occur when the less volatile gas condenses or freezes. As a rule, the condensation or freeze-out occurs over a relatively narrow temperature range. Within this range the position of the central surface is very sensitive to temperature, and can measure it with extreme accuracy and reproducibility.

Other objects of the invention will in part be obvious and will in part appear hereinafter. The invention accordingly comprises the apparatus possessing the construction, combination of elements, and arrangement of parts which are exemplified in the following detailed disclosure and the scope of the application of which will be indicated in the claims.

For a fuller understanding of the nature and objects of the present invention, reference should be had to the following detailed description taken in connection with the accompanying drawings wherein.

Figure 1:
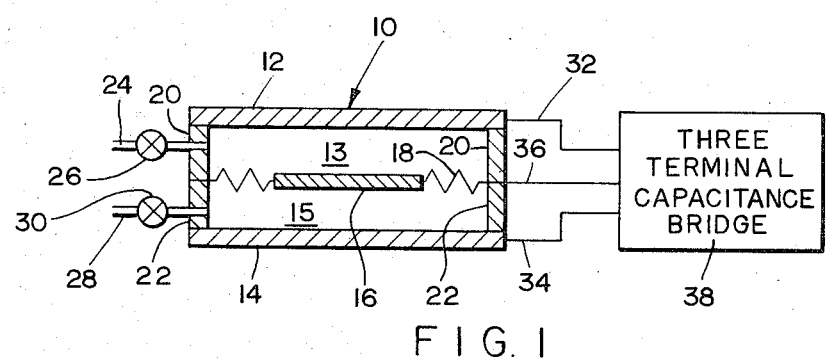
FIG. 1 is a cross-sectional view of a simple form of apparatus in accordance with this invention, and wherein a capacitance bridge is shown as the means for measuring the movement of the central surface.

The transducer of the present invention may take many different forms of which FIG. 1 is a simplified version and will serve adequately to show its operation. Transducer 10 is made up of two closed chambers 13 and 15, which have outer or end walls 12 and 14 respectively and are separated from each other by dividing wall 16. Side walls 20 and 22 complete the closure of chambers 13 and 15, respectively. Dividing wall 16 is mounted for movement between surfaces 12 and 14 by flexible support 18, which may be a suitable form of metal bellows, here shown schematically. Chambers 13 and 15 may be of equal or different volumes. Wall 16 may be equidistant between walls 12 and 14, or nearer to one than to the other. Each of walls 12, 14, and 16 comprises an electrically conductive surface, which constitutes either a part of, or the entire wall, and these electrically conductive surfaces are connected through leads 32, 34, and 36 respectively to a three-terminal capacitance bridge 38 of any well-known type capable of measuring the capacitance between the conductive surface of dividing wall 16 and those of walls 12 and 14. The conductive surfaces of walls 12, 14 and 16 are electrically insulated from each other; e.g. side walls 20, 22 are preferably of electrically-insulating material.

Chambers 13 and 15 are completely closed and have no gaseous communication with each other, or with the outside, except as provided by pipes 24, and 28. These pipes or equivalent conduits serve to withdraw or supply gaseous fluid from or to chambers 13 and 15. When these chambers are filled with the desired gases, the valves 26, 30 respectively are closed. In place of these valves, the pipes 24, 28 may be sealed off by well known techniques after the desired gases have been supplied to chambers 13 and 15. This latter practice is preferred in the smaller embodiments of the transducer of this invention.

Figure 2:
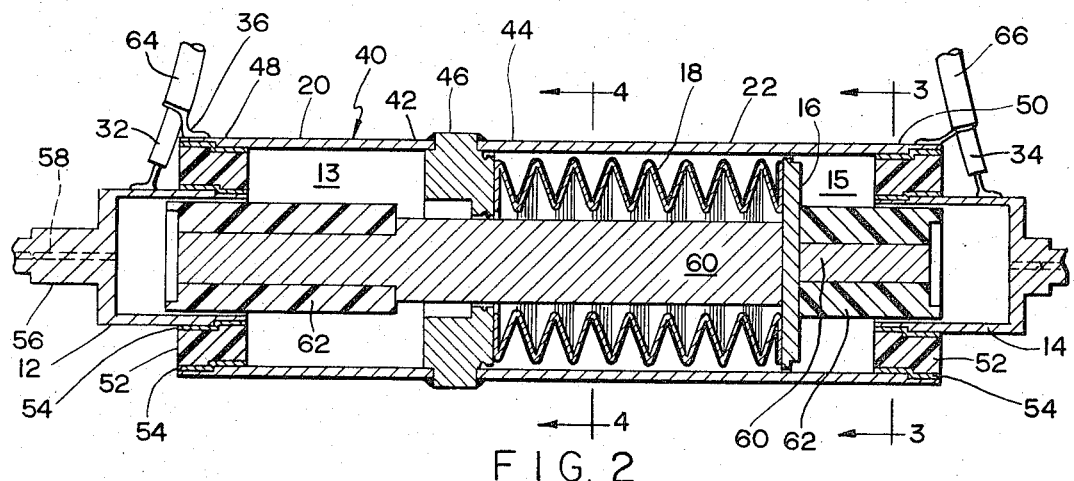
FIG. 2 is a schematic, cross-sectional view of a more detailed form of the invention particularly adapted for cryogenic use.
Figure 4:
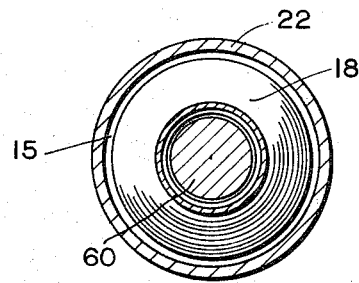
FIG. 4 is another cross-section of the embodiment of FIG. 2 taken along the line 4—4.
Figure 3:
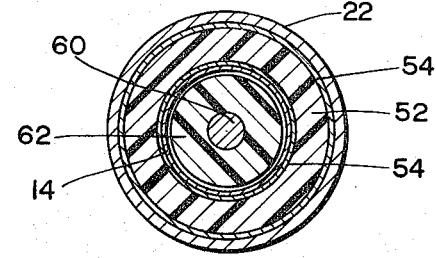
FIG. 3 is a cross-section taken along the line 3—3 in FIG. 2.

Referring now to FIGS. 2–4, there is shown a more detailed embodiment of the present invention particularly adapted for use in a cryogenic environment and in which like numerals denote like parts. This embodiment includes a rigid, fluid-tight hollow enclosure 40 of fixed volume, formed of a pair of colinearly disposed rigid, hollow elongated members, respectively forming side walls 20 and 22. Members 20 and 22 are of like, substantially uniform internal and external diameters and are joined to one another at respective ends 42 and 44 by means such as annular ring or flange 46 which projects interiorly of enclosure 40. Members 20 and 22 and flange 46 are preferably formed of a rigid electrically conductive material, such as a metal, having high heat conductivity, and are all joined to one another, as by welding to form a fluid-tight seal. The other ends 48 and 50 of respective members 20 and 22 are closed by outer walls in the form of respective, substantially identical cups 12 and 14.

Each cup is substantially a hollow elongated cylinder having one end open and the other closed, and is positioned coaxially with members 20 and 22 with the open end facing toward the interior of enclosure 40. The external diameter of a cup is substantially less than the internal diameter of one of members 20 and 22. Each cup is formed of an electrically and thermally conductive rigid material, such as a metal. In the annular space between cup 12 and member 20 there is disposed annular ring 52 of an electrically insulating substance, preferably vitreous, such as glass or ceramic and thus substantially rigid, firmly bonded to both the cup and member by sealing material 54. The joints between the cup and ring 52, and between the member and ring 52 are preferably scarf joints so that the path of sealing material 54 from the interior of enclosure 40 to its exterior is tortuous and a straight line cannot be extended therethrough. The closed end of cup 12 is provided with nipple 56 extending outwardly therefrom and centrally bored with a sealable passage 58 for providing sealable communication between the interior and exterior of the enclosure. Cup 14 is similarly disposed and sealed to member 22 through another like ring 52 and sealing material 54.

Means are provided for partitioning, or dividing the interior of enclosure 40 into two fluid-tight chambers 13 and 15, the volumes of which are inversely variable with respect to one another. To this end, there is included an electrically-conductive dividing wall or flat plate 16, typically formed of a metal, disposed substantially transversely across the longitudinal axis of enclosure 40. Plate 16 is fixidly mounted on movable means, such as guide rod 60 which extends centrally from and perpendicular to plate 16. Rod 60 is dimensioned in length to be shorter than the distance between the bases of the cups but long enough so that its extremities be within the interior of cups regardless of the positioning of rod 60. The depth of cups 12 and 14, and the length of rod 60 are established so that the rod can be moved readily axially within enclosure 40 between extreme positions at which plate 16 is respectively adjacent one end of the enclosure and adjacent flange 46.

Each end of the rod bears a cover 62 of sufficient thickness and shape to insure a close sliding fit within the interior of its corresponding cup. Cover 62 preferably is a coating of a material, such as polytetrafluorethylene, which serves the dual purpose of keeping rod 60 electrically insulated from the cups and of providing a surface having a minimal coefficient of sliding friction with respect to the metal of the cups. The mounting of plate 16 on the rod and the fit of the latter in the cups (the axes of rotation of which are preferably precisely aligned with the longitudinal axis of the enclosure) insures that plate 16 will not wobble as it is moved axially along the enclosure axis.

The positioning means further includes flexible means such as bellows 18 disposed wholly within enclosure 40 for sealing the periphery of plate 16 preferably to flange 46, thus completing the division of enclosure 40 into separate chambers 13 and 15 having no ready gas communication between them. Bellows 18 preferably is electrically conductive in order to provide electrical access to plate 16. Coaxial cable 64 comprises central lead 32 connected to cup 12. Another coaxial cable 66 comprises lead 34 connected to cup 14. The outer leads of both cables are connected to members 20 and 22 and to ground, thereby constituting lead 36.

Figure 5:
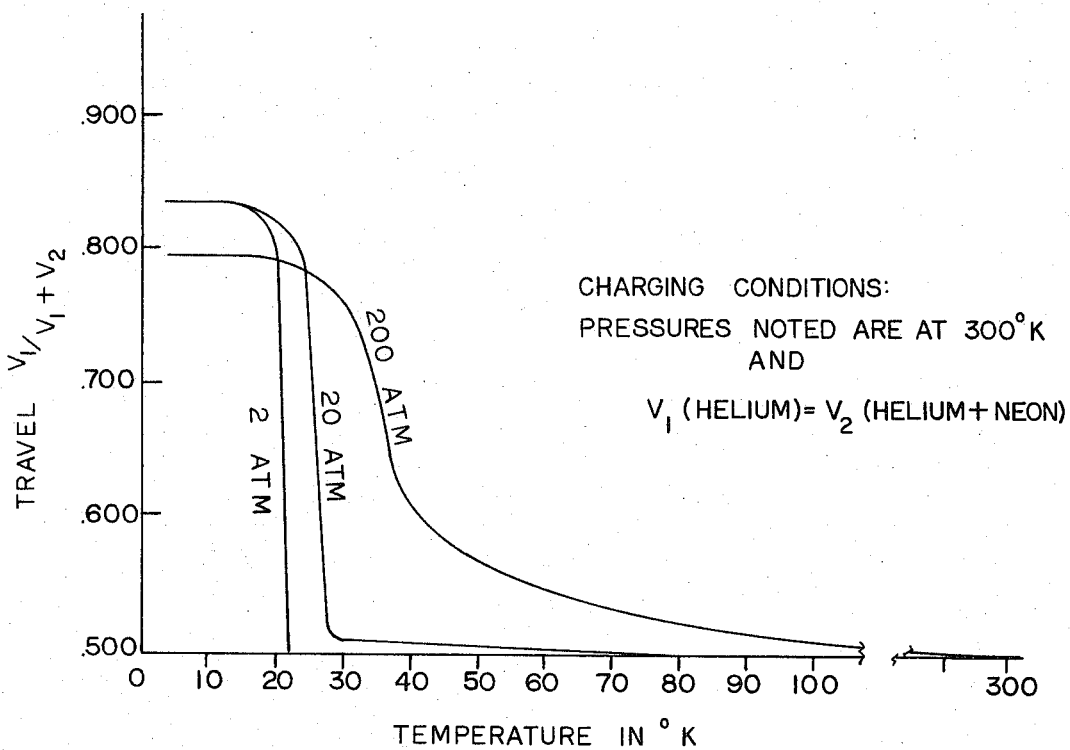
FIG. 5 is a graph illustrating the operation of one embodiment of the invention.

FIG. 5 illustrates a particular example of how the apparatus of this invention acts in the measurement of low temperatures—in this example around the range 20 to 40° K. Thus, using the device of FIG. 1 (FIG. 2 would work similarly), one chamber, say 13, is filled with helium and the other, namely 15, with a mixture of helium and neon. Filling (or removal of the gases as the case may be) can be accomplished through passages 58 into chambers 13 and 15. A mixture of equal parts helium and neon, rather than pure neon, is used in order to prevent complete displacement of the dividing wall 16 when the neon condenses. The partial pressure of the neon is approximately four times the partial pressure of the helium when the mixture is at normal ambient temperatures (about 300° K.). At that temperature, the volumes of the pure helium and the neon-helium mixture are equal. Three initial pressure levels for the transducer, all corresponding to normal ambient temperature, e.g. 300° K. were employed, namely 2, 20, and 200 atmospheres.

The results of these experiments are shown in FIG. 5. This chart shows the position of the dividing member as a function of the temperature of the system. The following features are noted:

(a) The position of dividing wall 16 is relatively insensitive to temperature in the range between 300° K. and 100° K.
(b) The transducer is very sensitive to temperature change over the temperature range from initial neon condensation to almost complete (say 99%) neon condensation.
(c) Increase in the initial charging pressure has the following effects:
 (i) increasing the temperature level at which maximum sensitivity is obtained;
 (ii) increasing the temperature range for high sensitivity read-out; and
 (iii) increasing the sensitivity of read-out in the temperature range from 100° K. to 50° K.

The performance of this system can be modified by changing the neon-helium mixture ratio and by varying the initial volume ratio. For example, the dimensionless travel of dividing wall 16 can be materially increased by making the initial volume of the neon-helium mixture larger than that of the helium. Thus, referring back to FIG. 1, chamber 15 could be arranged to occupy a larger space than chamber 13.

Similarly a large number of other gases or gaseous mixtures may be used. The preferred gases are the noble gases, nitrogen and hydrogen in view of their relative chemical inertness and low boiling points. For example, hydrogen can be substituted for neon in the foregoing example, and in such case the curves of FIG. 5 are shifted approximately 7° K. to the left. As another example, if the helium and helium-neon referred to above are replaced by $He^3$ and $He^4$, respectively, in equal volumes, and at a pressure of 20 atm., the dividing wall 16 remains nearly stationary until the temperature reaches about 4° K. The wall 16 then moves rapidly toward the other wall confining the $He^4$ (as the latter fluid condenses), reaching equilibrium at about 2° K. There is thus provided an extremely sensitive temperature transducer in the 2° to 4° K. range. This range can be adjusted by adjusting the initial pressure, as illustrated in the case of the helium and helium-neon system shown in FIG. 5. Thus, increasing the pressure broadens the range of temperatures measured; decreasing the pressure lowers the temperatures measurable.

In forming a transducer of the type shown in FIG. 2 for use in a cryogenic thermometric device, a number of problems are to be considered arising out of the quite high internal pressures used, for example the tendency of light gases such as hydrogen and helium to permeate even metals, and problems of maintaining bonds between dissimilar materials over a very wide range of temperatures, e.g., from room temperature to as low as 2° K. To provide a superior transducer which overcomes these difficulties, certain materials and techniques are employed.

For example, cups, such as 12, formed from machined stainless steel bar stock have exhibited a tendency to be quite porous to hydrogen. Consequently, the cups are preferably made of flat sheet-metal stock, such as 0.032" nickel chromium alloy, stainless steel or the like, which has been rolled to provide a substantially uniform crystal grain directed along the plane of the sheet. The cups are pressed from this stock to provide a form in which the grain structure maintains its substantial parallelism with the adjacent surface throughout the material. This structure exhibits much improved retention of light gases even at high pressures. Members 20 and 22 can be made of bored bar stock in a like metal, such as stainless steel, in which the grain runs longitudinally along the bar. Bellows 18 preferably are formed of very thin (e.g. 0.002") stainless steel, coated substantially uniformly with not less than 40 microinches of gold which serves as an excellent gas permeation barrier. Bellows 18 is positioned only between the two chambers, thus cannot provide leak or permeation paths for the gas from inside to the outside of the enclosure. While glass, for use as ring 52, can be found having a thermal coefficient of expansion which closely matches stainless steel, it is usually fragile and is difficult to machine. For this reason, it is preferred to use, for ring 52, a high alumina (e.g. >95%) ceramic material first rough-formed in a mold. The molded ceramic material can then be accurately finished by machining to form its precise inside and outside dimensions, as well as the scarf joints.

In either case with glass or ceramic, as sealing material 54, it is preferred to employ solid silver applied in its molten phase after the joint surfaces have been wetted with a thin film of molten molybdenum. Not only does the silver provide an excellent metal-to-ring bond, but it allows up to 3 to 4 microinches of temperature induced movement between the ring and metal, without bond weakening or deterioration of the gas seal, thus obviating precise matching of coefficients of expansion. It is postulated that these advantages arise out of the ductility of silver as well as the readiness with which it forms strong bonds with vitreous materials and with other metals.

Because the silver-filled joints are scarfed to provide long and tortuous paths, gas diffusion therethrough is minimized. Because the assembly employs a unitary rigid enclosure, high internal pressures can be used, but the bellows (which is mechanically weak inasmuch as its spring constant is reduced to a minimum) is never subjected to any high pressure differential.

Advantages of the herein-described transducer have already been referred to. In addition it should be noted that since the read-out is electrical, the only connection to the readout element or bridge 38 will be the small wires 32, 34, and 36 which exhibit negligible heat conduction. It is also clear that the sensitivity of this device is extremely high in the region in which one of the gases is condensing. The range of the device can be thus further increased by having a mixture of three or more different gases in one or both of the chambers 13 and 15. In fact, a nearly-linear position-temperature relationship can be attained by appropriate selection of gases and pressures, and over a considerable range. An approach to this, with only two gases, is in fact shown in the 200 atm. curve of FIG. 5. And finally, since the pressures on both sides of dividing wall 16 become essentially balanced, the latter will reach an equilibrium position determined by such pressures, except for the spring characteristics of bellows 18 which are so small in comparison to the pressure forces as to be considered negligible and can be ignored.

Various other means than a capacitance bridge may be used for measuring the displacement of dividing wall 16 with respect to walls 12 and 14. For example, by attaching to or forming dividing wall 16 of a magnetizable element and surrounding the enclosure part with one or more coils through which electric current flows, one can detect the change in field caused by displacement of the magnetizable element. Still other measuring means, within the scope of the appended claims, will be evident to those skilled in this art.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. Apparatus adapted to measure an ambient temperature within a predetermined operating range of temperatures, comprising in combination:
    a first and second surface, and a third surface positioned between said first and second surfaces, all of said surfaces being electrically conductive and being separated from each other spatially and electrically;
    means connected electrically with said surfaces for measuring the capacitance between said third surface, and each of said first and second surfaces, said surfaces being disposed in a fluid-tight, hollow, substantially rigid enclosure formed of a heat-energy conductive material;
    said third surface constituting at least a portion of partition means substantially non-elastically mounted for dividing the interior of said enclosure into two fluid-tight chambers;
    said first and second surfaces forming at least part of opposite ends of said enclosure;
    a first normally gaseous fluid filling one of said chambers;
    a second normally gaseous fluid filling the other of said chambers and being a different gaseous fluid than said first fluid;
    only one of said fluids being so constituted as to condense, at least in part, from a gas to a liquid under the condition of pressure at which it subsists at the temperature being measured within said range;
    said third surface being movable so as to maintain the vapor pressure in each of said enclosure in substantial equality with one another throughout said range; and
    means connected electrically with said surfaces for measuring reactance proportional to the position of said third surface with respect to said first and second surfaces.

2. Apparatus adapted to measure an ambient temperature within a predetermined operating range of temperatures, comprising, in combination:
    first and second electrically conductive surfaces;
    rigid means for spatially and electrically separating said surfaces a fixed distance from one another, and together with said surfaces forming a substantially fluid-tight, hollow, rigid enclosure;
    a third surface constituting at least a portion of partition means substantially non-elastically mounted for dividing the interior of said enclosure into two fluid-tight chambers;
    a flexible wall portion constituting the remainder of said partition means and sealed to both the periphery of said third surface and to the interior of said rigid means intermediate said first and second surfaces;
    for permitting movement of said third surface within said enclosure;
    a first normally gaseous fluid filling one of said chambers;
    a second normally gaseous fluid filling the other of said chambers and being a different gaseous fluid than said first fluid;
    only one of said fluids being so constituted as to condense, at least in part, from a gas to a liquid under the condition of pressure at which it subsists at the temperature being measured within said range;
    said third surface being movable so as to maintain the vapor pressure in each of said enclosures in substantial equality with one another throughout said range; and
    means connected electrically with said surfaces for measuring reactance proportional to the position of said third surface with respect to said first and second surfaces.

3. Thermometric apparatus for determining ambient temperatures within a predetermined operating range of cryogenic temperatures and comprising:
    a fluid tight, substantially rigid, hollow enclosure formed of metal having its crystalline grain structure directed substantially parallel to its surfaces;
    partition means dividing the interior of said enclosure into two fluid-tight chambers and including a surface mounted for movement between the ends of said enclosure so that said chambers have volumes variably inversely related to one another;
    a first fluid disposed in one of said chambers;
    a second fluid disposed in the other of said chambers;
    each of said fluids having physical characteristics such that a change in volume thereof responsive to an increment of temperature in said range differs from the corresponding volume change of the other of said fluids responsively to said increment;
    means for measuring the displacement of said surface relative to the opposite ends of said enclosure.

4. Apparatus as defined in claim 3 wherein one of said fluids comprises a gas selected from normal hydrogen, normal helium, isotopes of hydrogen and helium, and mixtures of hydrogen and helium.

5. Apparatus as defined in claim 3 wherein said first fluid is helium and said second fluid is a helium-neon mixture.

6. Apparatus as defined in claim 3 wherein said first fluid is helium and said second fluid is a hydrogen-helium mixture.

7. Thermometric apparatus for determining ambient temperatures within a predetermined operating range of temperatures and comprising:
    a fluid-tight, substantially hollow enclosure formed by a hollow, elongated metal member, metallic bodies positioned in closing relation to each end of said member, and means for electrically insulating said bodies from said member and for sealing said bodies to said ends of said member;
    partition means dividing the interior of said enclosure into two fluid-tight chambers and including a surface mounted for movement between said bodies so that said chambers have volumes variably inversely related to one another;

a first fluid disposed in one of said chambers;
a second fluid disposed in the other of said chambers;
each of said fluids having physical characteristics such that a change in volume thereof responsive to an increment of temperature in said range differs from the corresponding volume change of the other of said fluids responsively to said increment;
each of said fluids being present in respective substantially fixed quantities throughout at least said operating range; and
means for measuring the displacement of said surface relative to the opposite ends of said enclosure.

8. Apparatus as defined in claim 7 wherein said means for electrically insulating said bodies from said member is a vitreous material.

9. Apparatus as defined in claim 8 wherein said vitreous material is bonded to both said bodies and said member with a layer of silver.

10. Apparatus as defined in claim 8 wherein said vitreous material is a ceramic comprising aluminum oxide.

11. Apparatus as defined in claim 7 including a bellows sealed to the interior of said enclosure intermediate said bodies and to said surface, said bellows being gold-plated.

References Cited

UNITED STATES PATENTS

| | | | |
|---|---|---|---|
| 766,820 | 8/1904 | Fulton | 73—362.6 |
| 2,999,386 | 9/1961 | Wolfe | 73—398 |
| 3,046,369 | 7/1962 | Hicks | 73—368.7 |
| 3,085,433 | 4/1963 | Shmueli | 73—368 X |

LOUIS R. PRINCE, *Primary Examiner.*

D. M. YASICH, *Assistant Examiner.*